(12) United States Patent
Ferrier et al.

(10) Patent No.: US 8,915,464 B2
(45) Date of Patent: Dec. 23, 2014

(54) FAST, LONG-RANGE AIRCRAFT

(75) Inventors: Jean-Jacques Ferrier, Velaux (FR);
Paul Eglin, Roquefort-la Bedoule (FR)

(73) Assignee: Airbus Helicopters, Marignane Cedex (FR)

( * ) Notice: Subject to any disclaimer, the term of this patent is extended or adjusted under 35 U.S.C. 154(b) by 123 days.

(21) Appl. No.: 13/592,772

(22) Filed: Aug. 23, 2012

(65) Prior Publication Data

US 2014/0034774 A1 Feb. 6, 2014

(30) Foreign Application Priority Data

Sep. 12, 2011 (FR) ...................................... 11 02741

(51) Int. Cl.
| *B64C 27/22* | (2006.01) |
|---|---|
| *B64C 29/00* | (2006.01) |
| *B64C 27/08* | (2006.01) |
| *B64C 27/26* | (2006.01) |
| *B64C 27/28* | (2006.01) |

(52) U.S. Cl.
CPC ................. *B64C 27/08* (2013.01); *B64C 27/26* (2013.01); *B64C 27/28* (2013.01)
USPC ............................................. 244/12.3; 244/6

(58) Field of Classification Search
USPC ............... 244/6, 7 A, 7 R, 12.3, 17.11, 17.19, 244/17.21, 17.23
See application file for complete search history.

(56) References Cited

U.S. PATENT DOCUMENTS

| 2,445,354 | A | * | 7/1948 | Hoppes ...................... 244/17.23 |
|---|---|---|---|---|
| 3,483,696 | A | | 12/1969 | Gilbert |
| 3,905,565 | A | | 9/1975 | Kolwey |
| 6,789,764 | B2 | * | 9/2004 | Bass et al. ........................ 244/10 |
| 7,296,767 | B2 | | 11/2007 | Palcic |
| 7,334,755 | B2 | * | 2/2008 | Svoboda, Jr. ............... 244/17.23 |
| 7,412,825 | B2 | * | 8/2008 | Muylaert ......................... 60/324 |
| 7,546,975 | B2 | * | 6/2009 | Richardson ................ 244/17.13 |
| 7,628,355 | B2 | | 12/2009 | Palcic |
| 8,070,089 | B2 | | 12/2011 | Ferrier |
| 2004/0056144 | A1 | * | 3/2004 | Bass et al. ........................ 244/10 |
| 2006/0054737 | A1 | * | 3/2006 | Richardson ................ 244/17.11 |

(Continued)

FOREIGN PATENT DOCUMENTS

| FR | 2929243 A1 | 10/2009 |
|---|---|---|
| FR | 2946315 A1 | 12/2010 |
| GB | 1120658 A | 7/1968 |
| WO | 2007014531 A1 | 2/2007 |

OTHER PUBLICATIONS

Search Report and Written Opinion; Application No. FR 1102741; dated May 9, 2012.

*Primary Examiner* — Philip J Bonzell
(74) *Attorney, Agent, or Firm* — Brooks Kushman P.C.

(57) ABSTRACT

An aircraft (1) comprising a fuselage (2), a rotary wing (10) having two contrarotating main rotors (12) arranged in tandem above the fuselage (2), at least one propulsion member (20), and a power plant (30). Each propulsion member (20) is carried by a rear portion (3) of the fuselage. The aircraft (1) includes an interconnection system (40) providing a permanent connection between the power plant (30) and the rotary wing (10), except in the event of a failure or during training, the aircraft (1) having differential control means (50) for controlling the cyclic pitch of the blades of the main rotors (12) to control the aircraft (1) in yaw, and inhibition means (60) for inhibiting each propulsion member (20).

14 Claims, 1 Drawing Sheet

(56) References Cited

U.S. PATENT DOCUMENTS

| | | | |
|---|---|---|---|
| 2006/0266879 A1* | 11/2006 | Svoboda, Jr. | 244/7 A |
| 2006/0269414 A1 | 11/2006 | Palcic | |
| 2009/0014580 A1 | 1/2009 | Piasecki | |
| 2009/0216392 A1 | 8/2009 | Piasecki | |
| 2010/0310371 A1 | 12/2010 | Eglin | |

\* cited by examiner

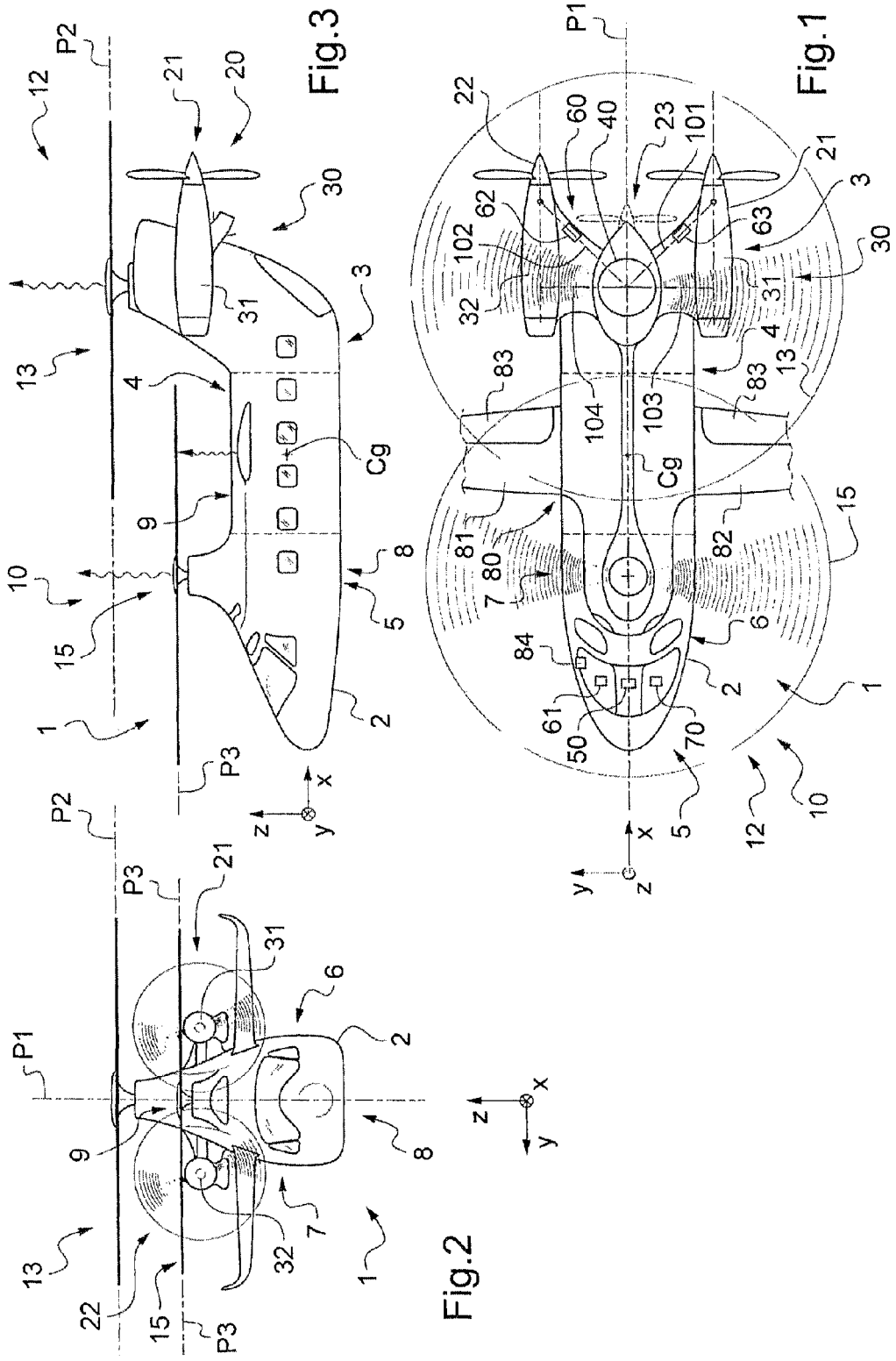

FAST, LONG-RANGE AIRCRAFT

CROSS REFERENCE TO RELATED APPLICATIONS

This application claims priority to FR 11 02741 filed on Sep. 12, 2011, now FR 2,979,900 B1 issued Aug. 30, 2013, the disclosure of which is incorporated in its entirety by reference herein.

BACKGROUND OF THE INVENTION (1) Field of the Invention

The present invention relates to a long-range aircraft having a high forward speed in cruising flight.

This advanced rotorcraft concept seeks to combine at reasonable cost the effectiveness in vertical flight of a conventional helicopter with the high travel speed performance made possible by using propulsion propellers and installing modern engines.

(2) Description of Related Art

In order to understand the object of the invention clearly, it is appropriate to recall the main types of flying machine corresponding to airplanes and to rotorcraft.

The term "rotorcraft" designates any aircraft in which lift is provided in full or in part by at least one rotary wing. The rotary wing usually comprises at least one rotor of large diameter and of axis that is substantially vertical while the aircraft is standing on the ground.

The rotorcraft category includes several distinct types of aircraft.

Firstly, there is the helicopter having at least one main rotor that is driven by a suitable power plant and that provides both lift and propulsion.

A helicopter may have two lift rotors providing it with lift and propulsion. These two rotors may be arranged one behind the other along the longitudinal axis of said rotorcraft: the aircraft is then referred to as a tandem-rotor rotorcraft.

In a tandem-rotor rotorcraft, the first and second lift rotors are generally contrarotating so that the yaw torque generated in one direction by the first rotor is greatly reduced or even eliminated by the yaw torque generated in the opposite direction by the second rotor. The combined effect of the yaw torque from both rotors thus enables the rotorcraft to be stabilized relative to its yaw axis in straight-line flight, without wind.

It should be observed that it is possible to synchronize the speeds of rotation of the rotors in order to guarantee that the blades of the rotors do not strike one another. It is then said that the blades are "meshing" since the rotary blades of the first rotor present a constant azimuth phase offset relative to the rotating blades of the second rotor.

Also known is the autogyro, which is a rotorcraft in which the rotor does not receive power, but provides lift by rotating in autorotation under the effect of the forward speed of the aircraft.

There is also the gyrodyne, which is a rotorcraft intermediate between the helicopter and the autogyro, in which the rotor provides only lift. The rotor is normally driven by a power plant during stages of takeoff, hovering flight, vertical flight, and landing, like a helicopter. A gyrodyne also has an additional propulsion system that is essentially different from the rotor assembly. In forward flight, the rotor continues to provide lift, but only in autorotation mode, i.e. without power being transmitted to said rotor.

Also known is the compound rotorcraft that takes off and lands like a helicopter, and that performs cruising flight like an autogyro.

Furthermore, the convertible rotorcraft constitutes another particular rotorcraft formula. This term covers all rotorcraft that change configuration while in flight: takeoff and landing in a helicopter configuration, cruising flight in an airplane configuration, with two rotors being tilted through about 90 degrees, for example, in order to act as propellers.

Of these various rotorcraft formulae, the helicopter is the simplest, and as such it has become the most common in spite of the fact that the maximum forward speed of a helicopter is about 300 kilometers per hour (km/h), which is small, and less than the speed that can be envisaged with formulae of the compound or convertible types, given that they are technically more complex and more expensive.

There is another, novel formula that is known and that goes by the name "hybrid helicopter" for convenience.

A hybrid helicopter has a fuselage and a main rotor for driving blades in rotation under power from at least one engine, advantageously two turbine engines arranged on top of the fuselage on either side of the longitudinal plane of symmetry of the aircraft. The hybrid helicopter is also provided with a wing and with at least one propulsion propeller.

Furthermore, the hybrid helicopter is fitted with an integrated drive train that comprises not only the engine, the rotor, and the propeller, but also a mechanical system interconnecting those elements.

With this configuration, the hybrid helicopter is remarkable in that the speeds of rotation of the engine outlets, of the rotor, of the propeller, and of the mechanical interconnection system are mutually proportional, with the proportionality ratio being constant regardless of the flying configuration of the hybrid helicopter under normal conditions of operation of the integrated drive train.

Consequently, and advantageously, the rotor is always driven in rotation by the engine and always develops lift regardless of the configuration of the hybrid helicopter, both in forward flight and in hovering flight. The hybrid helicopter is thus neither an autogyro, nor a gyrodyne, nor a compound rotorcraft, but is a novel type of rotorcraft.

The hybrid helicopter enables missions to be carried out during long periods of time in vertical flight, enables cruising flight to be performed at high speed, and also makes it possible to cover long ranges, while nevertheless being capable of performing hovering flight and taking off vertically.

In the state of the art, mention may be made of documents FR 2 946 315 and FR 2 929 243.

Furthermore, among documents presenting aircraft having two rotors, documents US 2009/0216392 and US 2009/0014580 are known.

Those documents US 2009/0216392 and US 2009/0014580 describe an aircraft that has two rotors in tandem, and that is fitted on either side of its structure with respective swivel-mounted ducted propellers, the ducting of each propeller being also fitted with a vane for redirecting the exhaust stream from the engine.

Document GB 1 120 658 describes an aircraft having two rotors in tandem and engines capable of providing thrust by delivering power simultaneously on an outlet shaft.

Each engine forms part of an engine-propulsion group including a low pressure turbine setting a propeller into rotation. Furthermore, each engine includes a free turbine either for driving the two rotors in tandem, or else for contributing to driving the propeller of the engine-propulsion group via clutches.

Document U.S. Pat. No. 3,905,565 describes a piloting system for an aircraft fitted with two rotors in tandem.

Document WO 2007/014531 describes an aircraft having two superposed contrarotating rotors, together with two tilting propellers.

Documents US 2006/269414, U.S. Pat. No. 7,296,767, and U.S. Pat. No. 7,628,355 describe an aircraft having two superposed contrarotating rotors that are associated with a propulsion propeller.

BRIEF SUMMARY OF THE INVENTION

An object of the present invention is thus to propose a tandem-rotor aircraft presenting long range and high forward speed in cruising flight.

According to the invention, a long-range and high-speed aircraft comprises:

a fuselage extending longitudinally in an anteroposterior plane of symmetry from a rear portion to a front portion, passing via a central portion, the center of gravity of the aircraft being situated in the central portion;

a rotary wing having two contrarotating main rotors arranged in tandem above said fuselage, a front main rotor being carried by the front portion and a rear main rotor being carried by the rear portion;

at least one propulsion member; and a power plant for delivering power to the main rotors and to each propulsion member.

The term "central portion" designates a segment of the aircraft including its center of gravity, the term "front portion" designates a segment of the aircraft starting from the nose of the aircraft to join the central portion and carrying the front main rotor, and the term "rear portion" designates a segment of the aircraft starting from the rear end of the aircraft to join the central portion, and carrying the rear main rotor.

In addition, the term "power plant for delivering power to the main rotors and to each propulsion member" designates a power plant generating the rotation of the main rotors and generating thrust by means of the propulsion member.

Furthermore, the term "above" refers to the positions of the members concerned when the aircraft is standing on the ground.

In addition, the aircraft includes means for controlling the collective pitch of the blades of the main rotors, such as conventional control means.

Thus, in particular on the ground, the two main rotors are arranged above the fuselage.

This aircraft is remarkable in particular in that:

each propulsion member is carried by the rear portion;

the aircraft includes an interconnection system providing a permanent connection between the power plant and said rotary wing, except in the event of a failure or during training;

the aircraft comprises differential control means for controlling the cyclic pitch of the blades of the main rotors to control the aircraft in yaw; and inhibition means for inhibiting each propulsion member.

This combination makes it possible to obtain a long-range aircraft capable of flying at high speed that presents optimum safety and generates limited sound nuisance.

In forward flight, the main rotors are always driven by the power plant, except in the event of a failure or of a failure being simulated for training purposes. Nevertheless, in fast forward flight, the main rotors contribute essentially to providing the aircraft with lift, while propulsion is provided essentially by at least one propulsion member.

Under such circumstances, it can be understood that each propulsion member has the sole function of contributing to propelling the aircraft, and not of contributing controlling the aircraft in yaw. Furthermore, it should be observed that the inhibition means serve to stop each propulsion member, e.g. at the request of a pilot.

Each propulsion member therefore does not perform a function that is critical and it may therefore easily be optimized insofar as each propulsion member has only the function of propelling the aircraft during certain stages of flight. It can be understood that it is easier to develop a propulsion member that is dedicated to propulsion than a propulsion member that must also, for example, contributing to controlling the aircraft in yaw.

By way of example, while hovering, the inhibition means may inhibit the operation of each propulsion member, the main rotor sufficing for controlling the aircraft in yaw.

Furthermore, the inhibition means are capable of inhibiting the operation of each propulsion member on the ground, since no propulsion member is needed for maneuvering on the ground. This produces significant advantages.

It can be understood that noise nuisance generated on the ground by the aircraft is minimized, since no propulsion member is generating unwanted noise on the ground while it is stopped.

Furthermore, no propulsion member presents danger for people in the vicinity of the aircraft, e.g. performing an operation of loading/unloading the aircraft.

This characteristic is maximized by arranging each propulsion member in the rear portion of the aircraft. This arrangement also makes it possible to use a winch placed above a side door and arranged in the central portion, for example.

Under such circumstances, the inhibition means may comprise:

a first device for minimizing the power consumed by the propulsion member, such as a device having the function of adjusting the angle of incidence of the blades of a propeller propulsion member so as to have a zero pitch, in particular during hovering flight; and a second device serving in particular to stop the propulsion member, in particular on the ground, without that also causing the rotary wing to stop.

Finally, it should be observed that the presence of two main rotors serves to maximize the load-carrying capacity of the aircraft and to facilitate flight in autorotation.

Under such circumstances, the synergy of the means used gives the aircraft specifically the ability to perform missions at sea, it being possible for the aircraft to travel long distances in reasonable time and also to land on a small area while generating minimum nuisance.

The architecture of the aircraft is also relatively simple and reliable from a safety point of view.

The aircraft may also include one or more of the following additional characteristics.

For example, the power plant may comprise an engine-propulsion member including an engine and a propulsion member.

For example, the engine may exhaust gas that serves firstly to drive a shaft connected to the interconnection system and secondly to be ejected via the propulsion member in order to contribute to propulsion.

In another variant, the engine may eject gas that drives a shaft connected firstly to the interconnection system and secondly to a propeller propulsion member.

In another example, the engine may include a working shaft driving firstly the interconnection system and secondly a propeller of said engine-propulsion member, the propeller representing a propulsion member of the aircraft.

In addition, in a first preferred embodiment, the aircraft includes at least two propulsion members arranged transversely on either side of said fuselage.

Using nautical vocabulary, the aircraft may then have a "port" propulsion member fastened to a "port" side of the rear portion and a "starboard" propulsion member fastened to a "starboard" side of the rear portion.

In a second embodiment that is compatible with the first embodiment, the aircraft may include a propulsion member arranged in the anteroposterior plane of symmetry of the aircraft.

Furthermore, at least one propulsion member may be a propeller member.

The propeller member may be ducted, in particular for the purpose of improving safety for ground personnel.

In another aspect, the aircraft may include regulation means for regulating a speed of rotation of the main rotors in order to maintain the speed of rotation of each main rotor equal to a first speed of rotation up to a first on-path air speed of said aircraft, and then to reduce the speed of rotation progressively in application of a relationship as a function of the on-path air speed of said hybrid helicopter, such as a linear relationship, for example.

It should be observed that the possibility of reaching fast on-path air speeds with the aircraft makes it necessary to reduce the speed of the air flow at the tips of the advancing blades of the main rotors and thus to reduce the speed of rotation of the main rotors in order to avoid any risk of compressibility phenomena appearing in said air flow.

Consequently, another advantage of the invention stems from the fact that the speed of rotation of each main rotor is equal to a first speed of rotation $\Omega 1$ up to a first on-path air speed V1, and is then reduced, preferably progressively, in application of a linear relationship as a function of the forward speed of the aircraft.

In practice, the speed of rotation of the main rotors is reduced progressively down to a second speed of rotation $\Omega 2$ corresponding to a second on-path air speed V2 that is the maximum speed of the aircraft.

Furthermore, the central portion may include a stationary wing, e.g. in register with the center of gravity.

Under such circumstances, the aircraft may include a wing that provides all additional lift in cruising flight in order to compensate for potential loss of lift from the main rotors caused by reducing their speeds of rotation $\Omega 1$, $\Omega 2$.

The wing may be made up of two half-wings, each half-wing extending on a respective side of the fuselage. The half-wings may together constitute a high wing, and may possibly present a dihedral angle. Nevertheless, they may also constitute a low wing, or a mid wing.

It should also be observed that it is generally difficult to place a stationary wing under a rotary wing, since the stationary wing gives rise to loss of lift, in particular during hovering flight.

Nevertheless, by placing the stationary wing in the central portion and whenever the two main rotors are a front rotor and a rear rotor, the loss of lift caused by the fixed wing is minimized.

Furthermore, it should be observed that the wing may include control means of the aircraft, such as control surfaces and/or flaps, for example.

It is possible to use these control means to control the pitching or roll angle of the high-speed aircraft, with the main rotors then contributing solely to providing the aircraft with lift. The control means also make it possible to control the distribution of lift between the fixed wing and the rotary wing, and to reduce the interactions between the rotary wing and the fixed wing.

According to another aspect, the rear main rotor is optionally above the front main rotor. As a result, the rear main rotor rotates in a first lift plane above a second lift plane in which the front main rotor rotates.

It is then possible to provide a large amount of ground clearance between each propulsion member and the ground so as to maximize safety for people moving in the proximity of the aircraft, in particular on a platform.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a plan view of the aircraft;

FIG. 2 is a front view of the aircraft; and

FIG. 3 is a side view of the aircraft.

DETAILED DESCRIPTION OF THE INVENTION

It should be observed that three mutually orthogonal directions X, Y, and Z are shown in each of the FIGS. 1 to 3.

The first direction X is said to be "longitudinal". The term "longitudinal" relates to any direction parallel to the first direction X.

The second direction Y is said to be "transverse". The term "transverse" relates to any direction parallel to the second direction Y.

Finally, the third direction Z is said to be "in elevation". The term "in elevation" relates to any direction parallel to the third direction Z.

FIG. 1 shows a long-range aircraft 1 having a fuselage 2.

The fuselage 2 extends longitudinally along an anteroposterior plane of symmetry P1 from a rear portion 3 to a front portion 5, passing via a central portion 4 in which the center of gravity Cg of the aircraft is located.

With reference to FIG. 2, the fuselage 2 extends transversely from a first side 6 referred to for convenience as "port" to a second side 7 referred to as "starboard".

With reference to FIG. 3, the fuselage 2 extends in elevation from a bottom portion 8 to a top portion 9 above the bottom portion 8.

Furthermore, with reference to FIG. 1, the aircraft 1 has a rotary wing 10.

The rotary wing 10 is made up of two contrarotating main rotors 12. Below, the rotary wing may be referred to as a "set of rotary wings" insofar as it comprises two main rotors 12.

More precisely, the rotary wing 10 includes a rear main rotor 13 carried by the rear portion 3, and a front main rotor 15 carried by the front portion 5, the rear main rotor 13 and the front main rotor 15 being located above the top portion 9 of the fuselage 2.

Furthermore, the fairings of the rear portion are preferably shaped so as to obtain a yaw stabilization effect.

Furthermore, with reference to FIG. 2, the rear main rotor 13 rotates in a first lift plane P2 that is higher than a second lift plane P3 in which the front main rotor 15 rotates. It should be observed that the term "lift plane" is used to designate the plane containing the blades of the associated main rotor 13 when the flapping movements of those blades are zero, and in the absence of any cyclic pitch.

With reference to FIG. 1, the aircraft 1 includes in particular differential control means 50 for controlling the cyclic pitch of the blades of the main rotors in order to control the aircraft in yaw. These differential control means may include rudder pedals or the equivalent acting via conventional means on the cyclic pitch of the blades.

Furthermore, the rear portion 4 of the aircraft carries at least one propulsion member 20 contributing to propelling the aircraft 1.

In the preferred embodiment of FIG. 1, the aircraft has two propulsion members 21 and 22 arranged transversely on either side of said fuselage 2. Thus, a first propulsion member 21 is on the first side 6 of the aircraft, while a second propulsion member 22 is on the second side 7.

In alternative or additional manner, the aircraft may include a propulsion member 23 arranged in an anteroposterior plane of symmetry P1 of the aircraft, shown using dotted lines in FIG. 1 only.

At least one propulsion member 20 may also be a propeller member, and it may possibly be ducted.

Furthermore, the aircraft has a power plant 30 for driving the main rotors 12 and for delivering the required power to the propulsion members.

The power plant 30 may include engines 31 and 32 driving an interconnection system 40 setting the main rotors into rotation. The interconnection system 40 then provides a continuous connection between said power plant 30 and said rotary wing 10, i.e. other than in the event of an accidental or simulated failure.

The interconnection system 40 may comprise a mechanical assembly having a front main gearbox driving a mast of the front main rotor, a rear main gearbox driving a mast of the rear main rotor, and at least one shaft connecting the front gearbox to the rear gearbox, and also drive trains 103 and 104 connecting this assembly to each of the engines of the power plant 30.

The power plant thus delivers the required power to each propulsion member.

In the example shown, the interconnection system 40 drives the propeller type propulsion members 21 and 22 via mechanical connections 101 and 102.

It should be observed that in an alternative version, the power plant co-operates directly with the propulsion members. Furthermore, it is possible to envisage an engine-propulsion member acting both as an engine for driving the interconnection system and as a propulsion member.

Independently of the embodiment, the aircraft includes inhibition means 60 for inhibiting each propulsion member in order to stop the propulsion member on the ground or in flight without stopping rotation of the main rotors.

For example, the inhibition means 60 may comprise respective clutches 62 and 63 between each of the propulsion members and the power plant, and control means 61 controlling the clutches 62 and 63 in order to separate the propulsion members from the power plant.

The clutch is also associated with means for blocking the mechanical connection so as to avoid the clutch slipping.

The inhibition means may also include means for adjusting the angle of incidence of the blades of a propeller propulsion member, e.g. for the purpose of adjusting this angle of incidence to a zero pitch in order to reduce the amount of energy consumed by the propeller.

Under such circumstances, the inhibition means may comprise:
a first device for minimizing the power consumed by the propulsion member; and/or a second device enabling the propulsion member to be stopped, in particular on the ground, without causing the rotary wing to be stopped.

In another aspect, the aircraft has adjustment means 70 for adjusting a speed of rotation $\Omega$ of said main rotors in order to maintain the speed of rotation $\Omega$ of each main rotor equal to a first speed of rotation $\Omega 1$ up to a first on-path air speed V1 of the aircraft 1, and subsequently reduce this speed of rotation $\Omega 2$ progressively with a predetermined linear relationship as a function of the on-path air speed of said hybrid helicopter.

The regulation means may comprise a processor unit suitable for controlling the members for controlling the pitch of the blades of the main rotors.

In addition, the aircraft 1 may include a fixed wing 80 arranged in the central portion 4. The fixed wing may include a wing having control surfaces 83 co-operating with piloting means 84 suitable for being operated by a pilot, for example.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A long-range and high-speed aircraft comprising:
a fuselage extending longitudinally in an anteroposterior plane (P1) from a rear portion to a front portion, passing via a central portion, the center of gravity (Cg) of the aircraft being situated in said central portion;
a rotary wing having two contrarotating main rotors arranged in tandem above said fuselage, the two contrarotating main rotors including a front main rotor being carried by said front portion and a rear main rotor being carried by said rear portion;
at least one propulsion member; and
a power plant for delivering power to said main rotors and to each propulsion member, the power plant comprising a first engine and a second engine, each propulsion member being associated with at least one of the first engine and the second engine;
wherein each propulsion member is carried by said rear portion and said aircraft includes an interconnection system providing a permanent connection between said power plant and said rotary wing, except in the event of a failure or during training, the interconnection system including a mechanical assembly having a front main gearbox driving a mast of the front main rotor, a rear main gearbox driving a mast of the rear main rotor, and at least one shaft connecting the front gearbox to the rear gearbox, the interconnection system further including a first drive train connecting the first engine to the mechanical assembly and a second drive train connecting the second engine to the mechanical assembly, said aircraft having differential control means for controlling the cyclic pitch of the blades of said main rotors to control the aircraft in yaw, each propulsion member having an associated clutch controlled by a controller to enable the propulsion member to be disconnected from the power plant.

2. The aircraft according to claim 1, wherein the first engine and the propulsion member cooperatively define an engine-propulsion member including an engine and a propulsion member.

3. The aircraft according to claim 1, wherein the at least one propulsion member includes at least two propulsion members arranged transversely on either side of said fuselage.

4. The aircraft according to claim 1, wherein the at least one propulsion member includes a propulsion member arranged in an anteroposterior plane of symmetry (P1) of the aircraft.

5. The aircraft according to claim 1, wherein the at least one propulsion member is a propeller member.

6. The aircraft according to claim 1, including a processor configured to regulate a speed of rotation ($\Omega$) of said main rotors in order to maintain the speed of rotation ($\Omega$) of each main rotor equal to a first speed of rotation ($\Omega 1$) up to a first on-path air speed (V1) of said aircraft, and then to reduce said speed of rotation ($\Omega$) progressively in application of a linear relationship as a function of the on-path air speed of said aircraft.

7. The aircraft according to claim 1, wherein said rear main rotor rotates in a first lift plane (P2) above a second lift plane (P3) in which the front main rotor rotates.

8. The aircraft according to claim 1, wherein said central portion includes a fixed wing.

9. The aircraft according to claim 8, wherein said fixed wing includes aircraft control means.

10. An aircraft comprising:
a fuselage having a front end and a rear end;
a power plant including a first engine and a second engine;
first and second contrarotating main rotors disposed above the fuselage in a tandem configuration;
a first mechanical linkage continuously drivingly coupling the power plant to the first and second main rotors, the first mechanical linkage including a first drive train drivingly coupling the first engine to the first and second main rotors and a second drive train drivingly coupling the second engine to the first and second main rotors;
at least one propulsion member disposed proximate the rear end;
a second mechanical linkage selectively drivingly coupling the power plant to the at least one propulsion member, wherein in at least one operating condition the second mechanical linkage drivingly couples the power plant to the at least one propulsion member and the first mechanical linkage drivingly couples the power plant to the first and second main rotors; and
an inhibitor configured to selectively inhibit the propulsion member.

11. The aircraft of claim 10, wherein the inhibitor comprises a clutch cooperating with the second mechanical linkage to selectively decouple the at least one propulsion member.

12. The aircraft of claim 10, wherein the fuselage has opposing first and second sides and the at least one propulsion member includes a first propeller disposed on the first side and a second propeller disposed on the second side.

13. The aircraft of claim 10, wherein the aircraft defines a plane of symmetry and the at least one propulsion member includes a propeller disposed with an axis of rotation along the plane of symmetry.

14. The aircraft of claim 10, wherein the first rotor has a first mast, the second rotor has a second mast, and the first mechanical linkage comprises a first gear box configured to drive the first mast, a second gearbox configured to drive the second mast, a shaft coupling the first gearbox and the second gearbox, and wherein the first drive train couples the first engine to the first gearbox and the second drive train couples the second engine to the second gearbox.

* * * * *